(12) United States Patent
Keith et al.

(10) Patent No.: US 10,000,928 B2
(45) Date of Patent: Jun. 19, 2018

(54) TIE FOR COMPOSITE WALL SYSTEM THAT IS BOTH SCREWABLE AND AXIALLY PUSHABLE

(71) Applicant: HK MARKETING LC, American Fork, UT (US)

(72) Inventors: David O. Keith, American Fork, UT (US); Jordan O. Keith, Saratoga Springs, UT (US)

(73) Assignee: HK MARKETING LC, American Fork, UT (US)

( * ) Notice: Subject to any disclaimer, the term of this patent is extended or adjusted under 35 U.S.C. 154(b) by 39 days.

(21) Appl. No.: 14/841,260

(22) Filed: Aug. 31, 2015

(65) Prior Publication Data
US 2017/0058520 A1 Mar. 2, 2017

Related U.S. Application Data

(60) Provisional application No. 62/209,237, filed on Aug. 24, 2015.

(51) Int. Cl.
*E04C 2/04* (2006.01)
*F16B 15/00* (2006.01)
(Continued)

(52) U.S. Cl.
CPC ............ *E04C 2/2885* (2013.01); *E04C 2/044* (2013.01); *F16B 15/00* (2013.01);
(Continued)

(58) Field of Classification Search
CPC ...... E04C 2002/047; E04C 2/288; E04C 5/07; E04C 2/2885; E04C 2/044
See application file for complete search history.

(56) References Cited

U.S. PATENT DOCUMENTS 1,511,711 A 10/1924 Atwell
1,876,683 A 9/1932 Johnson et al.
(Continued)

FOREIGN PATENT DOCUMENTS

CA 2392892 A1 * 1/2003 .......... F16B 25/0015
CN 203891249 10/2014
(Continued)

OTHER PUBLICATIONS

British Screw Threads Data, date unknown, p. 1-3.*
(Continued)

*Primary Examiner* — Elizabeth A Quast
(74) *Attorney, Agent, or Firm* — Workman Nydegger (57) ABSTRACT

Ties, and related methods, for use in making insulating composite wall structures including first and second structural layers comprising a hardenable material and an insulating layer having a high thermal resistance disposed between the structural layers. The tie includes features that allow it to readily be either axially pushed through the insulating layer (e.g., by hand), or screwed through the insulating layer, (e.g., using a powered tool such as a drill). Thus, a tie of a single configuration is provided which is suitable for both methods of installation. The tie may include discontinuous helical ribs including limited prominence so as to not interfere with the ability to axially push the tie into the insulating layer by hand, yet, the ribs are prominent enough to catch the insulating layer as the tie is drilled in, helping it to "screw" into the insulating layer.

22 Claims, 2 Drawing Sheets

(51) Int. Cl.
*E04C 2/288* (2006.01)
*F16B 25/00* (2006.01)
*F16B 35/04* (2006.01)

(52) U.S. Cl.
CPC ........ *F16B 25/0015* (2013.01); *F16B 35/048* (2013.01); *E04C 2002/047* (2013.01); *F16B 25/0031* (2013.01); *F16B 25/0047* (2013.01)

(56) References Cited

U.S. PATENT DOCUMENTS

| | | | |
|---|---|---|---|
| 2,645,929 A | 12/1948 | Jones | |
| D189,259 S | 11/1960 | Hughes | |
| D214,086 S | 5/1969 | Powell | |
| 4,018,023 A * | 4/1977 | Anderson | F27D 1/144 403/289 |
| 4,393,635 A | 7/1983 | Long | |
| 4,545,163 A * | 10/1985 | Asselin | E04G 17/06 249/213 |
| D284,267 S | 6/1986 | Lindell | |
| D286,180 S | 10/1986 | Korthoff | |
| 4,754,758 A | 7/1988 | Li | |
| D298,916 S | 12/1988 | Beatty | |
| 4,829,733 A * | 5/1989 | Long | E04B 1/80 52/250 |
| 4,846,655 A * | 7/1989 | Gulley | A01G 1/08 411/453 |
| 4,994,073 A | 2/1991 | Green | |
| 5,011,354 A | 4/1991 | Browniee | |
| 5,223,675 A | 6/1993 | Taft | |
| D357,855 S * | 5/1995 | Keith | D8/384 |
| 5,415,507 A | 5/1995 | Janusz et al. | |
| 5,433,558 A | 7/1995 | Gray | |
| 5,509,636 A | 4/1996 | Cotugno | |
| 5,519,973 A * | 5/1996 | Keith | B28B 19/003 411/439 |
| 5,570,983 A * | 11/1996 | Hollander | F16B 25/0015 411/308 |
| 5,606,832 A * | 3/1997 | Keith | B28B 19/003 411/439 |
| 5,673,525 A * | 10/1997 | Keith | B28B 19/003 411/487 |
| 5,692,356 A | 12/1997 | Baxter | |
| 5,809,723 A | 9/1998 | Keith et al. | |
| 5,830,399 A | 11/1998 | Keith et al. | |
| 5,996,297 A * | 12/1999 | Keith | E04C 2/044 411/456 |
| 6,112,491 A | 9/2000 | Keith et al. | |
| 6,116,836 A * | 9/2000 | Long, Sr. | E04C 2/044 411/424 |
| 6,138,981 A | 10/2000 | Keith | E04G 17/06 249/19 |
| 6,511,252 B1 * | 1/2003 | Andros | F16B 15/06 403/283 |
| D484,032 S | 12/2003 | Del Re | |
| 6,854,229 B2 | 2/2005 | Keith et al. | |
| 6,895,720 B2 | 5/2005 | Keith | |
| 7,266,931 B2 * | 9/2007 | Long, Sr. | E04C 2/044 52/309.11 |
| D581,776 S | 12/2008 | Yin-Feng | |
| D614,942 S | 5/2010 | Gaudron | |
| 8,109,706 B2 | 2/2012 | Richards | |
| 8,365,501 B2 | 2/2013 | Long, Sr. | |
| 8,696,284 B2 * | 4/2014 | Aicher | E04C 5/03 405/259.1 |
| 8,745,943 B2 | 6/2014 | Ciuperca | |
| 8,863,469 B2 | 10/2014 | Curtis et al. | |
| 8,910,445 B2 | 12/2014 | Hohmann | |
| D728,044 S | 4/2015 | Boatwright | |
| 9,169,635 B2 | 10/2015 | Andrews | |
| D744,646 S | 12/2015 | Nering et al. | |
| D764,266 S | 8/2016 | Keith | |
| D773,926 S | 12/2016 | Sweeney | |
| 2004/0055247 A1 | 3/2004 | Keith | |
| 2004/0118067 A1 * | 6/2004 | Keith | B28B 19/003 52/415 |
| 2004/0136803 A1 | 7/2004 | Grosch | |
| 2004/0237438 A1 * | 12/2004 | Keith | E04G 17/0742 52/428 |
| 2005/0016095 A1 | 1/2005 | Long, Sr. | |
| 2006/0032166 A1 | 2/2006 | Devalapura | |
| 2009/0185880 A1 | 7/2009 | Gong et al. | |
| 2011/0094176 A1 | 4/2011 | Bronner | |
| 2012/0266560 A1 | 10/2012 | Panasik et al. | |
| 2013/0074433 A1 * | 3/2013 | Ciuperca | E04B 1/355 52/426 |
| 2013/0153628 A1 | 6/2013 | Euteneuer | |
| 2013/0218177 A1 | 8/2013 | Miksza et al. | |
| 2014/0260034 A1 * | 9/2014 | Ciuperca | E04C 2/296 52/405.3 |
| 2017/0058520 A1 | 3/2017 | Keith | |
| 2017/0204895 A1 | 7/2017 | Rodenhouse | |

FOREIGN PATENT DOCUMENTS

| | | |
|---|---|---|
| JP | 2004225265 | 8/2004 |
| RU | 131396 | 8/2013 |

OTHER PUBLICATIONS

U.S. Appl. No. 29/531,564, filed Jun. 26, 2015, Keith et al.
*Questions and Answers about System SC for Structurally Composite Concrete Sandwich Walls.* Boone: Thermomass System SC, 2012. Print.
Thermomass. "Insulated Cast-in-Place Construction Using Thermomass System CIP." Online video clip. *YouTube.* YouTube, Mar. 20, 2012. Web. Accessed Jan. 22, 2016. <https://www.youtube.com/watch?v=VoHzDS9Yuwc>.
*Thermomass.* Thermomass System SC, n.d. Web. Accessed Jan. 22, 2016. <http://www.thermomass.com/>.
U.S. Appl. No. 29/531,564, Apr. 18, 2016, Notice of Allowance.

\* cited by examiner

TIE FOR COMPOSITE WALL SYSTEM THAT IS BOTH SCREWABLE AND AXIALLY PUSHABLE

CROSS-REFERENCE TO RELATED APPLICATIONS

The present application claims the benefit of U.S. Provisional Patent Application Ser. No. 62/209,237, filed Aug. 24, 2014 and entitled "TIE FOR COMPOSITE WALL SYSTEM THAT IS BOTH SCREWABLE AND AXIALLY PUSHABLE", the disclosure of which is incorporated by reference in its entirety.

BACKGROUND OF THE INVENTION

1. The Field of the Invention

The present invention relates to composite wall structures and, more specifically to the field of connectors used to secure together multiple layers of material within the composite wall structures.

2. The Relevant Technology

As new materials and compositions have been developed, apparently unrelated materials have been synergistically combined to form useful composite materials. One such example is seen in the area of building and construction, in which high strength structural walls have been coated or layered with highly insulative materials which generally have relatively low structural strength. The resulting composite wall structure has high strength and is highly insulative. In some conventional implementations, the structural component of such as a wall is built first, after which the insulating layer or sheet is attached to the structural component. Thereafter a protective cover is placed over the insulating material to protect and hide it. In other implementations, the insulating layer is sandwiched between high strength layers. The insulating barrier reduces the transfer of thermal energy across the composite wall structure.

Concrete is one of the least expensive and strongest materials commonly used in the construction industry. Unfortunately, concrete, which is a mixture of hydraulic cement, water, and an aggregate such as rocks, pebbles, and sand, offers relatively poor insulation compared to many other materials. For example, a slab of concrete having an 8 inch thickness has an R value of only about 0.64, while a one-inch thick panel of polystyrene has an R value of about 5.0. The R value of a material is proportional to the thermal resistance of the material and is useful for comparing the insulating properties of materials used in the construction industry.

In contrast to concrete, highly insulative materials, at least those of reasonable cost, typically offer poor structural strength and integrity. While lightweight aggregates having higher insulating ability may be incorporated within concrete to increase the insulating effect thereof, the use of such aggregates in an amount that has a dramatic effect on the insulation ability of the concrete will usually result in greatly decreased strength of the resulting structure.

It has been found that positioning at least one concrete layer adjacent to at least one insulating layer provides a composite wall structure that has both good insulating capability and good structural strength. One strategy for forming these composite wall structures is to position an insulating layer between two concrete layers. This technique, however, poses the risk of allowing the two concrete layers to collapse together or to separate apart during construction or subsequent use of the building. Accordingly, it is necessary to structurally bridge or connect the two concrete layers together. This is conventionally accomplished by using metal casting form ties.

Because metal readily conducts thermal energy, metal casting form ties that are used to structurally bridge a pair of structural layers have the effect of significantly reducing the insulating properties of a composite wall. In particular, such casting form ties provide channels through which thermal energy may be conducted. This is true even though the ties may be surrounded by ample amounts of insulating material. Composite wall structures that use metal casting form ties do not prevent heat from flowing from a relatively warm inside wall to a colder outside wall during cold weather, for example, as effectively as composite walls that do not use metal casting form ties. Of course one might construct a building having no structural bridges between the inner and outer structural walls, although the result would be a building having inadequate stability for most needs.

In order to reduce thermal bridging, some have employed casting form ties having a metal portion that passes through the concrete layers and a thermally insulating portion that passes through the insulating layer, e.g., U.S. Pat. No. 4,545,163 to Asselin. Others have developed casting form ties that may be formed from polymeric or other highly insulative materials. Examples of the foregoing include U.S. Pat. Nos. 4,829,733 and 6,116,836 to Long; and Applicant's own earlier U.S. Pat. Nos. 5,519,973; 5,606,832; 5,673,525; 5,830,399; 6,138,981, 6,854,229 and 6,895,720, each to Keith. For purposes of disclosing insulating casting form ties used to secure a composite wall structure together, each of the foregoing patents are incorporated herein by specific reference.

One technique for forming composite wall structures is known in the art as the "tilt-up" method, wherein the wall is formed horizontally (e.g., on the ground). The first structural layer is poured, the insulating layer is positioned thereover, and insulating or metal ties having a length that is more than, equal to, or less than the width of the composite wall structure are placed substantially orthogonally through the insulating layer, into the first structural layer, which is not yet hardened. The opposite end of the ties stick up through the insulating layer. The second structural layer is then poured over the insulating layer, and allowed to harden. Once the composite wall structure has hardened, it may be tilted up to the desired vertical orientation and secured in place.

Another technique for forming composite wall structures is known in the art as the "cast-in-place" method, wherein the wall is formed within vertically positioned casting forms that are erected at or near the location where the composite wall structure is to be finally positioned. In the cast-in-place method the forms and insulating layer are first positioned vertically, after which concrete or other structural material is poured into the spaces between the insulating layer and casting forms. Insulating or metal casting form ties having a length that is more than, equal to or less than the width of the composite wall structure are placed substantially orthogonally through a vertically oriented insulating layer, with the ends of the ties extending out of either surface of the insulating layer. The opposite ends of the ties become anchored within the structural layers once those layers harden.

BRIEF SUMMARY

The present disclosure relates to ties for use in making insulating composite wall structures including first and second structural layers comprising hardenable material (e.g., concrete) and an insulating layer (e.g., expanded polystyrene) having a higher thermal resistance than the structural layers, disposed between the first and second structural layers. The tie may include an elongate shaft including a penetrating segment, an impact segment, and a mesial segment therebetween. A pointed tip may be provided at an end of the penetrating segment for penetrating the insulating layer, e.g., and the first structural layer while the first structural layer is in an unhardened state. A plurality of discontinuous helical ribs may be provided extending laterally outward from the mesial segment of the shaft, where the discontinuous helical ribs extend laterally (e.g., radially) outward from the shaft no more than about 20% of the thickness (e.g., diameter) of the shaft. As a result of the limited prominence of the ribs, they do not substantially interfere with the ability to axially push the mesial segment into the insulating layer (e.g., by hand) without rotating the tie. Yet, the ribs are prominent enough so that if the user wishes to screw the tie in (e.g., using a powered drill or other tool), rather than axially press it in by hand, the ribs will catch the insulating layer as the tie is drilled in, helping it to advance ("screw" into) the insulating layer. Advantageously, the tie is thus one that provides the user to choose between whether to screw the tie into place, e.g., using a powered drill, or to press it into place manually.

Another embodiment is directed to a tie including an elongate shaft including a penetrating segment, an impact segment, and a mesial segment therebetween. A pointed tip may be provided at an end of the penetrating segment for penetrating the insulating layer and the first structural layer (if already present) while the first structural layer is in an unhardened state. The pointed tip may be generally conical in shape, with a cut-out in the cone to form at least one rotatable cutting edge in the pointed tip, which aids in cutting a pathway through the insulating layer during insertion through the insulating layer. A plurality of discontinuous helical ribs may be provided extending laterally outward from the mesial segment of the shaft, where the discontinuous helical ribs extend laterally (e.g., radially) outward from the shaft no more than about 20% of the thickness (e.g., diameter) of the shaft, so as to allow a user to select whether to axially press the tie into the insulating layer (e.g., by hand), or to screw it into place (e.g., using a powered tool) as described above. An enlarged non-circular driving head may be provided at an end of the impact segment, which driving head can be received within a corresponding socket of a powered driving tool (e.g., a drill) to drive (e.g., screw) the tie through the insulating layer and into the first structural layer.

Another aspect of the present disclosure is directed to a method for manufacturing an insulating composite wall structure including first and second structural layers and an insulating layer disposed between the first and second structural layers in a desired configuration. The method may include providing a tie as described herein, forming a first structural layer from a hardenable high strength structural material (e.g., concrete), and positioning an insulating layer comprising a material having a higher thermal resistance than the first structural layer against or onto a surface of the first structural layer while the first structural layer is in a substantially unhardened state. One or more ties are axially pushed or screwed through the exposed surface of the insulating layer. Where the first structural layer is already present (e.g., in a tilt-up method), the tie is advanced least partially into the first structural layer while in a substantially unhardened state. Because the ties include the relatively shallow discontinuous helical ribs as described herein, they are able to either be screwed in, or axially pressed in, according to whatever preference the user exhibits.

The penetrating segment of the tie penetrates the insulating layer and becomes positioned within at least a portion of the first structural layer while that layer is unhardened, so as to become embedded substantially within the first structural layer. The mesial segment is disposed substantially within the first structural layer, and a substantial portion of the impact segment (e.g., all of it) extends from the exposed surface of the insulating layer. The second structural layer of hardenable high strength material (e.g., concrete) is formed (e.g., poured) against or on the exposed surface of the insulating layer such that the portion of the impact segment extending from the insulating layer is embedded within the second structural layer. Where a cast-in-place method is employed, the high strength structural layers may be poured simultaneously (e.g., equalizing pressure on either side of the insulating layer). In such a cast-in-place method, the ties may be placed when convenient relative to pouring of the structural layers into forms with the insulating layer therebetween. In an embodiment, the ties may be placed before pouring. The hardenable structural layers are allowed to harden, forming the insulating composite wall structure in which the first structural layer, the second structural layer, and the insulating layer are secured together by the one or more ties.

Such a method may manufacture the wall by a tilt-up method, a cast-in-place method, or any other desired method. For at least a cast-in-place method, the first and second structural layers could be poured (e.g., filling of the form cavities) at substantially the same time. For a tilt-up method, typically, the bottom structural layer will be poured first, followed by placement of the insulating layer thereover, followed by pouring of the second structural layer.

Another aspect of the present disclosure is directed to an insulating composite wall structure including a first structural layer of a hardened or hardenable high strength structural material, a second structural layer of a hardened or hardenable high strength structural material, and an insulating layer having a higher thermal resistance than the first and second structural layers, disposed between the first and second structural layers. The structural layers may be secured to one another, with the insulating layer therebetween, by one or more ties such as those disclosed herein.

These and other advantages and features of the present invention will become more fully apparent from the following description and appended claims, or may be learned by the practice of the invention as set forth hereinafter.

BRIEF DESCRIPTION OF THE DRAWINGS

To further clarify the above and other advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings, in which.

DETAILED DESCRIPTION OF THE PREFERRED EMBODIMENTS

I. Introduction

The present invention relates to ties for use in making insulating composite wall structures including first and second structural layers comprising a hardenable material (e.g., concrete) and an insulating layer having a higher thermal resistance than the structural layers, disposed between the first and second structural layers. The tie includes features that allow it to readily be either axially pushed through the insulating layer (e.g., by hand), or screwed through the insulating layer, (e.g., using a powered tool such as a drill). Thus, a tie of a single configuration is provided which is suitable for both methods of installation.

The tie may include an elongate shaft including a penetrating segment, an impact segment, and a mesial segment therebetween. A pointed tip may be provided at an end of the penetrating segment for penetrating the insulating layer. A plurality of discontinuous helical ribs may be provided extending laterally outward from the mesial segment of the shaft, where the discontinuous helical ribs extend laterally (e.g., radially) outward from the shaft no more than about 20% of the thickness (e.g., diameter) of the shaft. As a result of the shallow, limited prominence of the ribs, they do not substantially interfere with the ability to axially push the mesial segment into the insulating layer by hand, e.g., without significant rotation of the tie during advancement. Yet, the ribs are prominent enough so that if the user wishes to screw the tie in (e.g., using a powered drill or other tool), rather than axially press it in by hand, the ribs will catch the insulating layer as the tie is drilled in, helping it to advance, and screw into the insulating layer. Thus, the tie allows the user the choice between whether to screw the tie into place, e.g., using a powered drill, or to press it into place manually.

II. Exemplary Ties

Figure 1:
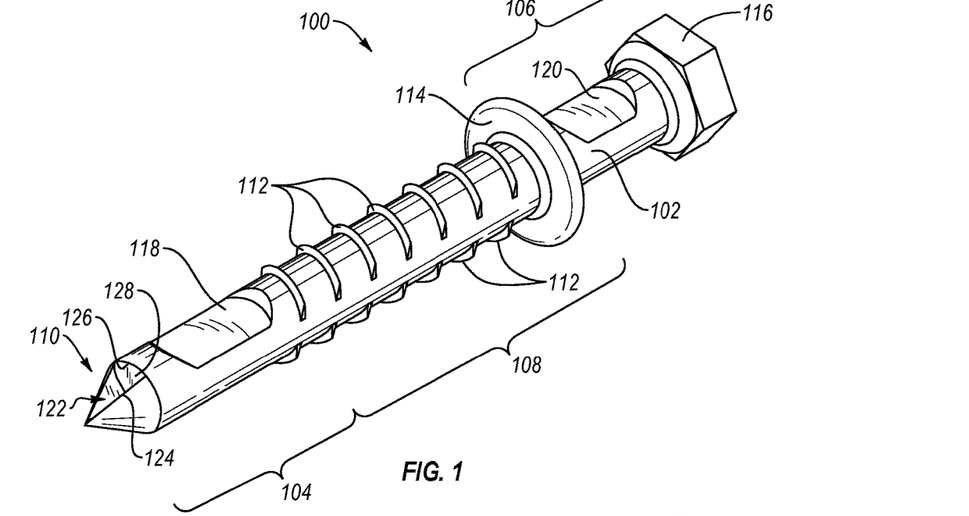
FIG. 1 is a perspective view of an insulating tie including features of the present disclosure.

FIG. 1 shows a perspective view of an exemplary tie 100. Tie 100 may include an elongate shaft 102 that is generally cylindrical (e.g., circular in cross-section) in shape. Shaft 102 may include a penetrating segment 104, an impact segment 106, and a mesial segment 108 therebetween. A pointed tip 110 may be provided at the end of penetrating segment 104 for penetrating an insulating layer (e.g., a sheet of expanded polystyrene foam (EPS)). In an embodiment, pointed tip 110 may be generally conical in shape, as shown. In other embodiments, other shapes may be possible, e.g., so long as the pointed tip ends in a tip having a substantially reduced cross-section relative to that of the shaft 102. Pointed tip 110 facilitates penetration of the tie 100 through the insulating layer, and becomes positioned within a first structural layer of the composite wall during use.

A plurality of discontinuous, helical ribs 112 are provided extending laterally (e.g., radially) outward from mesial segment 108 of shaft 102. Ribs 112 are specifically configured to be relatively shallow, as opposed to very prominent ribs or threads that might otherwise be formed on segment 108. Because of their shallow, relatively "low" profile, the ribs 112 to not substantially interfere with the ability to axially press the mesial segment into the insulating layer, should a user choose to insert the tie in this manner. For example, there is no substantial difference in the manually applied force needed to axially press such a tie into the insulating layer, as compared to the manually applied force needed to axially press an otherwise similar tie, but without the ribs 112, even if pilot holes are not predrilled through the insulating layer. In other words, the force routinely applied in manually pressing a tie including a smooth shaft along the mesial segment through an insulating layer may also be sufficient to press the tie 100 through the insulating layer, even though tie 100 includes ribs 112.

The inclusion of ribs 112 does however offer the user a choice between manually pressing the tie 100 into place through the insulating layer, or to couple the distal end of the tie 100 into a powered tool (e.g., drill) and screw the tie into place through the insulating layer. Thus, the tie 100 is suitable for both uses, whether a user desires to manually press the tie into place, or to screw it in, e.g., using a powered tool that rotates the tie as it advances through the foam layer.

In an embodiment, ribs 112 are configured to extend laterally a distance from the exterior of shaft 102 that is not more than about 20% of the thickness (e.g., diameter) of shaft 102. In another embodiment, the lateral extension or "prominence" of such ribs 112 may be no more than about 15% of the thickness of the shaft 102, no more than about 10%, or from about 5% to about 10% of the thickness of the shaft 102. The present inventors have found that such shallow ribs are sufficient to catch the adjacent insulating layer as the tie is screwed into the insulating layer, but not so great as to make it difficult to just axially press the tie into the insulating layer, without any substantial rotation of the tie during insertion. The ribs 112 are thus configured to permit either mode of insertion, allowing the user to decide how they want to insert the ties, and permitting the same tie to be inserted according to either mode of insertion, according to the preference of the user.

Figure 4A:
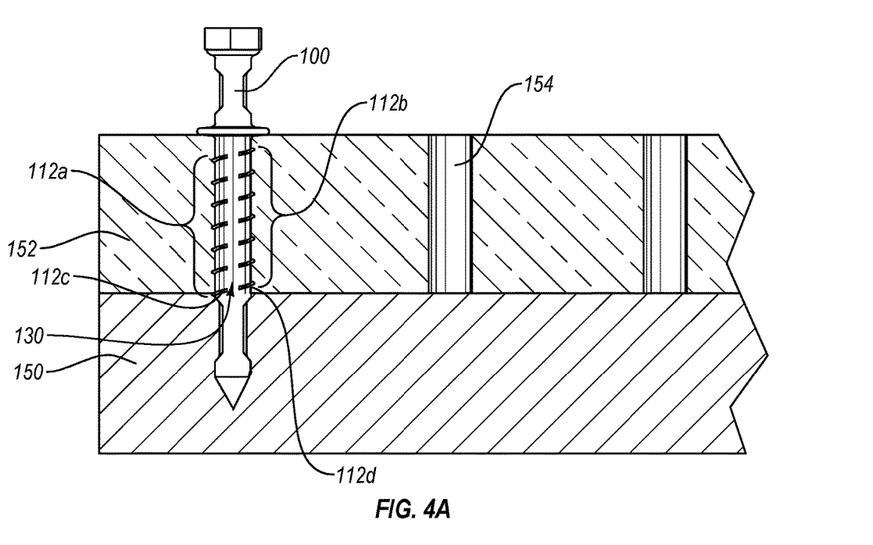
FIG. 4A is a front elevation cross-sectional view of a partially completed composite wall structure.

As seen in FIG. 1, a flange 114 may be provided on shaft 102 at the end of mesial segment 108 (e.g., between mesial segment 108 and impact segment 106). Such a flange or other protruding ridge acts as a means for positioning the tie within the insulating layer, acting as a stop against further insertion of shaft 102 into the insulating layer. In other words, the user may easily insert (screw or axially press) the tie 100 into the insulating layer until the flange 114 contacts the face of the insulating layer, as shown in FIG. 4A. The flange 114 thus limits penetration, acting as a stop to ensure that the impact segment 106 proximal to flange 114 remains outside the insulating layer, so that the impact segment can become embedded within the second structural layer of the composite wall structure.

As will be apparent from FIG. 1, the flange 114 may be far more prominent than ribs 112. For example, flange 114 may have a diameter or width dimension that is about double that of shaft 102. Thus, flange 114 is configured to stop advancement into the insulating layer, unlike ribs 112.

An enlarged non-circular driving head 116 may advantageously be provided at an end of impact segment 106. Driving head 116 may be shaped and sized for receipt into a corresponding socket of a driving tool (e.g., a powered drill), to allow the user to screw the tie into the insulating layer. In the illustrated embodiment, driving head 116 is shown as hexagonal, although it will be appreciated that other non-circular geometric configurations are also possible. Various polygons (e.g., square, rectangular, hexagonal, etc.) may be particularly preferred. Such a non-circular shape allows the socket of the driving tool to apply rotational torque to the shaft 102, screwing it into the insulating layer. In an example, the driving head may be a ¾ inch hex head.

Penetrating segment 104 of shaft 102 may further include recessed portions 118 or other means for anchoring the penetrating segment 104 within the first structural layer, once that layer has hardened. For example, concrete or other hardenable material may enter into recessed portions 118, and once hardened, prevents pull-out of segment 104. In a similar manner, the region between enlarged driving head 116 and flange 114 results in a similar recess structure, which can fill with concrete, so as to resist pull-out of impact segment 106 from the second structural layer, even though shaft 102 may not necessarily be recessed within the region between 116 and 114. Actual recesses 120 or other means for anchoring the impact segment 106 may be provided. As illustrated, recesses 120 may be aligned with recesses 118 (e.g., on the same face, with the same orientation about shaft 102) as one another. Furthermore, the cut-out 122 described below may also be aligned with one or both of recesses 118 or 120.

FIG. 1 also shows how pointed tip 110 may include a cut-out 122, so as to provide at least one cutting edge 124, which cuts into the insulating layer as the pointed tip 110 is rotated into the insulating layer. Such a cut-out and cutting edge facilitates easier screw-in of the tie when the user chooses to screw the tie in, rather than manually pushing it through the insulating layer. As shown in FIG. 1, cut-out 122 may be in the form of a notch cut out of the cone-shaped tip 110. Cut-out notch 122 may extend from the distal tip towards a base 126 of the generally conical pointed tip. The notch 122 may include a generally flat triangular shaped floor 128 that extends from an apex at the longitudinal axis of the shaft (at the tip) to the base 126. The cutting edge 124 may be disposed at an interface between the notch 122 and an exterior of the generally conical pointed tip 110, as shown.

Figures 2, 3:
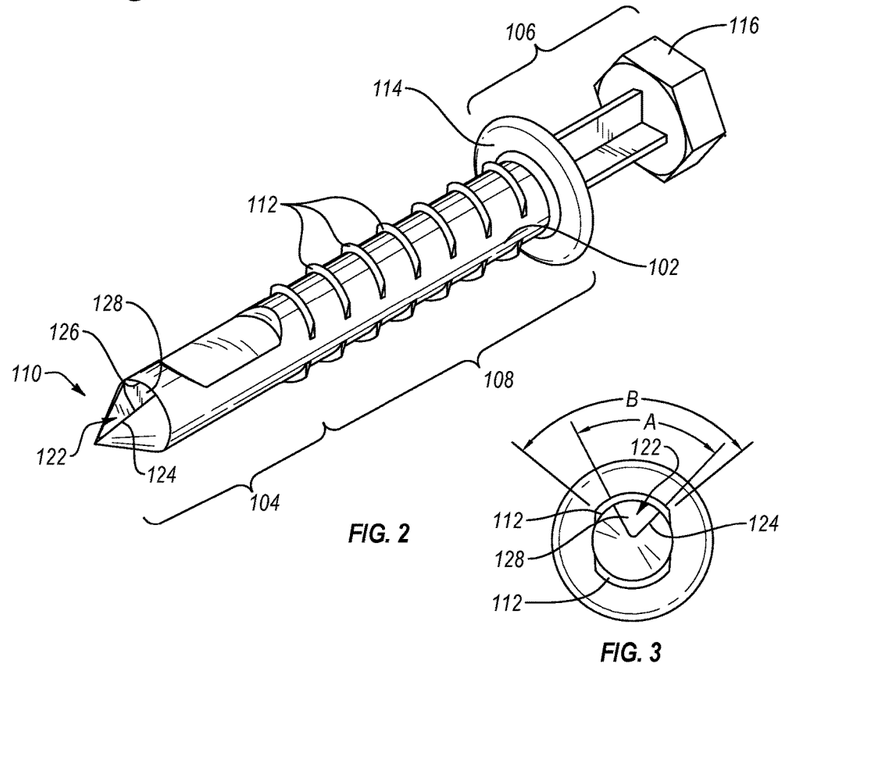
FIG. 2 is a perspective view of another exemplary insulating tie including features of the present disclosure.
FIG. 3 is a front end view of the insulating tie of FIG. 1.

As perhaps best seen in FIG. 3, in an embodiment, the cut-out 122 may extend over an angle A about 10° to about 145° of a perimeter (e.g., circumference) of the generally conical pointed tip 110. In other words, along base 126, about 10° to about 145° of the full 360° circumference may be cut-away. In another embodiment, the cut-out 122 may extend over about 20° to about 100°, or about 40° to about 90° (e.g., about 70°).

Discontinuous ribs 112 may extend over an arc length B of the mesial segment of the shaft that is from about 60° to about 140°, from about 70° to about 130°, or about 90° to about 110° (e.g., about 100°), relative to a 360° circumference of the mesial segment. As shown in FIGS. 1 and 3, shaft 102 may include two faces, sections, or "sides" which are helically ribbed. As shown, each section of ribs 112 may be aligned with the flat or recess 118 and/or 120. One section of ribs may be positioned opposite the other section of ribs (e.g., one section on a "front" face, and the other section on a "back" face, centered 180° apart). In other words, corresponding discontinuous helical ribs may include two gaps per helical rotation about the mesial segment of the shaft. In another embodiment, the ribs may be differently configured. For example, the ribs may be offset relative to the flats of recesses 118 and/or 120. In any case, the ribs 112 may be discontinuous in their formation about shaft 112, increasing the ease with which the tie 100 may be axially pushed through an insulating layer, without screwing it therethrough, while still providing the ability to be easily and readily inserted by either mode. In another embodiment, a continuous rib or thread may be employed, although this may be less preferred, as described above. Discontinuity of the ribs also aids in removal of the tie 100 from a mold used in injection molding.

Figure 4B:
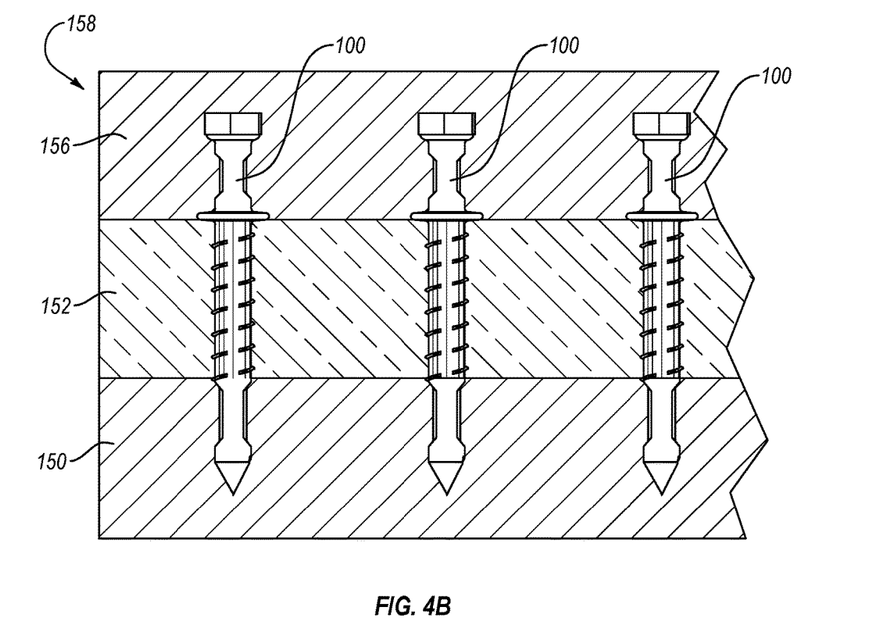
FIG. 4B is front elevation cross-sectional view of a completed composite wall structure according to the present disclosure.

As will be apparent from the side views of FIGS. 4A and 4B, the separate sections of ribs 112a and 112b may be aligned so that an individual rib from one section is aligned with the corresponding rib of the adjacent section, just as if the two ribs were continuous, rather than including a discontinuity therebetween. For example, rib 112c of rib section 112a is aligned with rib 112d of rib section 112b, as if a single rib or thread extended therebetween, at a given pitch angle, but for discontinuity 130. While two discontinuities are shown, separated from one another 180° center-to-center, it will be appreciated that only a single discontinuity may be provided (e.g., with double the arc lengths for the ribs, as disclosed above (e.g., about 200°). In other embodiments, more than two discontinuities could be provided (e.g., 3 discontinuities spaced 120° apart, etc.).

FIG. 2 illustrates a tie similar to that of FIG. 1, but illustrating how the shaft may be other than circular, particularly the impact segment 106. Advantageously, the penetration and mesial segments 104 and 108 may be circular in cross-section, which facilitates their screw-in insertion. Various other possible modifications will be apparent to one of skill in the art, in light of the present disclosure. The ties may be injection molded from a suitable plastic material. Injection molding of the entire tie from a single, integral piece of molded material is particularly advantageous, as no assembly of individual parts is required, as is typical for many other existing ties. Exemplary materials are high strength (e.g., as opposed to inexpensive, weak plastic materials such as polypropylene, polyethylene, etc.), including but not limited to polyphenylsulfone (PPSF), polythalamide, or combinations of various suitable injection moldable materials. Various other suitable materials are disclosed in the patents referenced above, e.g., U.S. Pat. No. 6,854,229, already incorporated by reference. Any such materials, or combinations thereof, may be used. Preferred materials exhibit resistance to alkaline environments, high melt temperatures (e.g., about 700° F. or more), high impact strength, no or minimal shear cracking, high tensile strength, etc. The material employed may be reinforced with glass fibers. In an embodiment, the interior of the mold surfaces may be textured (e.g., sandblasted) to provide a rough surface to the exterior of the tie. Such roughened surface provides for increased pull out strength relative to the concrete into which the tie becomes embedded. For example, an exemplary tie may have a pull out strength of 100 lbs or more.

FIGS. 4A-4B further illustrate a method of using ties according to the present invention. For example, an insulating composite wall structure including first and second structural layers and an insulating layer disposed therebetween (e.g., sandwiched) may be formed. The method may include providing a tie (e.g., 100) such as any of those described herein. A first structural layer 150 may be formed from a hardenable high strength structural material (e.g., concrete). An insulating layer 152 comprising a material having a higher thermal resistance than the first structural layer 150 onto a surface of the first structural layer 150 while the first structural layer 150 is in a substantially unhardened state. The insulating layer 152 may be formed of expanded polystyrene or any other suitable insulating material. In an embodiment, the insulating layer may be preformed, e.g., positioned as one or more sheets over the first structural layer 150. One or more ties (e.g., 100) are axially pushed or screwed through an exposed face of the insulating layer 152 and at least partially through the first structural layer 152 while the first structural layer 152 has not yet fully hardened. Once inserted, the user may wish to rotate the tie (e.g., a quarter turn or more) to ensure that the tie becomes properly anchored in the first structural layer. If screwing in the ties, the ties may be pressed into the insulating layer to a depth of the first helical rib, and then screwed in the rest of the way. Such an action is fast, fluid, and any transition from pressing the tie to screwing the tie may be nearly imperceptible, as it occurs very quickly.

Because the ties (e.g., 100) include the relatively shallow ribs 112, the ties may advantageously be either axially pushed or screwed through the exposed face of the insulating layer 152 based on selection of the particular user. In other words, the same tie configuration may be installed either way. In any case, upon advancing the tie through the insulating layer and into the first structural layer, the tie penetrates the insulating layer 152 and at least a portion of the first structural layer 150 and is thereby embedded substantially within the first structural layer 150, such that the mesial segment (e.g., 108 is disposed substantially within the insulating layer 152, and such that a substantial portion of the impact segment (e.g., 106) extends from the exposed surface of the insulating layer 152. As seen in FIG. 4A, in an embodiment, the insulating layer may include preformed pilot holes 154 therein. In another embodiment, no pilot holes may be provided, and the ties 100 may simply be screwed or axially pushed through the insulating layer.

The second structural layer 156 is formed from a hardenable high strength structural material (e.g., concrete) on the exposed surface of the insulating layer 152 such that the substantial portion of the impact segment (e.g., 106) extending from the insulating layer 152 is embedded within the second structural layer (156). The first and second structural layers 150, 156 are allowed to harden, which forms an insulating composite wall structure 158 in which the first structural layer 150, the second structural layer 156, and the insulating layer 152 are secured together by the one or more ties (e.g., 100).

Where the ties are used in a tilt-up construction scheme, the first structural layer 150 may be poured, followed by placement of insulating layer 152 thereover. While layer 150 is still unhardened, ties 100 may be advanced through layer 152, into layer 150. Once ties are in place, the second structural layer 156 may then be poured over insulating layer 152. Tilt-up construction schemes may be preferred.

Where the ties are used in a cast-in-place construction scheme, the first and structural layers may be poured one after the other, or simultaneously. The ties may be advanced through the insulating layer 152 either before, during, or after pouring of the concrete of structural layers 150, 156. In any case, the ties 100 are positioned within the structural layers 150 and 156 before layers 150 and 156 have hardened. For example, the casting forms could be assembled, insulating layer 152 could be inserted into the casting forms (with channels on either side for pouring of structural layers 150, 156). The ties could be inserted at this point, before concrete is poured for structural layers 150, 156. Once ties 100 are in place, the structural layers 150, 156 could be poured (e.g., simultaneously), or one after the other.

Ties may be spaced at any desired intervals to achieve a desired level of composite action with the wall. By way of example, the ties may be positioned at 16 inch spacing intervals. Relatively closer spacing increases the composite action. Typically the first structural layer 150 may be relatively thin (e.g., about 3 inches), while the second structural layer 156 may be significantly thicker (e.g., 6 to 12 inches). In such configurations, the structural layer provides the necessary strength, so that the first structural layer may simply be a fascia layer. In such instances, the ties may only need to provide a relatively small degree of composite action (e.g., 10-20% composite action, such as 15%).

Numbers, percentages, or other values stated herein are intended to include that value, and also other values that are about or approximately the stated value, as would be appreciated by one of ordinary skill in the art encompassed by embodiments of the present disclosure. A stated value should therefore be interpreted broadly enough to encompass values that are at least close enough to the stated value to perform a desired function or achieve a desired result. The stated values include at least the variation to be expected in a suitable manufacturing process, and may include values that are within 25%, within 20%, within 10%, within 5%, within 1%, etc. of a stated value. Furthermore, the terms "substantially", "similarly", "about" or "approximately" as used herein represents an amount or state close to the stated amount or state that still performs a desired function or achieves a desired result. For example, the term "substantially" "about" or "approximately" may refer to an amount that is within 25%, within 20%, within 10% of, within 5% of, or within 1% of, a stated amount or value.

Ranges between any values disclosed herein are contemplated and within the scope of the present disclosure (e.g., a range defined between any two values (including end points of a disclosed range) given as exemplary for any given parameter).

As used in this specification and the appended claims, the singular forms "a," "an" and "the" include plural referents unless the context clearly dictates otherwise.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A tie for use in making an insulating composite wall structure including first and second structural layers comprising hardenable material and an insulating layer having a high thermal resistance disposed between the first and second structural layers, the tie comprising:
    an elongate shaft including a penetrating segment, an impact segment, and a mesial segment therebetween;
    a generally conical pointed tip at an end of the penetrating segment for penetrating the insulating layer, the generally conical pointed tip including a single cut-out therein to form a rotatable cutting edge in the generally conical pointed tip, wherein the single cut-out in the conical pointed tip comprises a single notch extending from a distal tip towards a base of the generally conical pointed tip, wherein the single notch comprises a generally planar triangular shaped floor extending from an apex at a longitudinal axis of the shaft to the base of the generally conical pointed tip, the generally planar triangular shaped floor being vertical when the longitudinal axis of the shaft is horizontal; and
    a plurality of discontinuous helical ribs extending laterally outward from the mesial segment of the shaft, wherein the discontinuous helical ribs extend laterally from the shaft no more than about 20% of a thickness of the shaft, so that the ribs do not substantially interfere with axially pushing the mesial segment into the insulating layer without rotating the tie during advancement, such that the tie may be axially pushed into the insulating layer and first structural layer, or screwed into the insulating layer and first structural layer, as selected by a user.

2. A tie as in claim 1, further comprising an enlarged non-circular driving head at an end of the impact segment which driving head can be received within a corresponding socket of a driving tool to screw the tie into the insulating layer and into the first structural layer.

3. A tie as in claim 2, wherein the enlarged non-circular driving head is polygonal.

4. A tie as in claim 2, wherein the enlarged non-circular driving head is hexagonal.

5. A tie as in claim 1, wherein the helical ribs extend laterally from the shaft from about 5% to about 10% of the thickness of the shaft.

6. A tie as in claim 1, wherein corresponding discontinuous helical ribs include two gaps per helical rotation about the mesial segment of the shaft.

7. A tie as in claim 6, wherein each discontinuous helical rib extends over an arc length of the mesial segment of the shaft that is from about 60° to about 140° relative to a 360° circumference of the mesial segment.

8. A tie as in claim 6, wherein each discontinuous helical rib extends over an arc length of the mesial segment of the shaft that is from about 90° to about 110° relative to a 360° circumference of the mesial segment.

9. A tie as in claim 1, wherein the helical ribs extend laterally from the shaft no more than about 10% of the thickness of the shaft.

10. A tie for use in making an insulating composite wall structure including first and second structural layers comprising hardenable material and an insulating layer having a high thermal resistance disposed between the first and second structural layers, the tie comprising:
   an elongate shaft including a penetrating segment, an impact segment, and a mesial segment therebetween;
   a generally conical pointed tip at an end of the penetrating segment for penetrating the insulating layer and positioning within the first structural layer while the first structural layer is in an unhardened state, the pointed tip being generally conical with a cut-out therein to form at least one rotatable cutting edge in the generally conical pointed tip, wherein the cut-out is a single cut-out, and comprises a single notch extending from a distal tip towards a base of the generally conical pointed tip;
   wherein the penetrating segment includes a recessed portion recessed into the shaft for anchoring the penetrating segment within the first structural layer once the first structural layer has hardened; and
   a plurality of discontinuous helical ribs extending laterally outward from the mesial segment of the shaft, the penetrating segment being devoid of any helical ribs, wherein the discontinuous helical ribs extend laterally from the shaft no more than about 20% of a thickness of the shaft;
   wherein the plurality of discontinuous helical ribs include a first section of ribs and a second section of ribs, the first section of ribs being on one face of the shaft, and the second section of ribs being on an opposite face of the shaft, so as to be centered 180° from the first section of ribs, wherein the first section of ribs is aligned with a first set of flats recessed into the shaft both distal and proximal to the first section of ribs, and wherein the second section of ribs is aligned with a second set of flats recessed into the shaft both distal and proximal to the second section of ribs.

11. A tie as in claim 10, wherein the single notch comprises a generally planar triangular shaped floor extending from an apex at a longitudinal axis of the shaft to the base of the generally conical pointed tip, the generally planar triangular shaped floor being vertical when the longitudinal axis of the shaft is horizontal.

12. A tie as in claim 11, wherein the cutting edge is disposed at an interface between the single notch and an exterior of the generally conical pointed tip, so that the cutting edge is on the exterior of the generally conical pointed tip.

13. A tie for use in making an insulating composite wall structure including first and second structural layers comprising hardenable material and an insulating layer having a high thermal resistance disposed between the first and second structural layers, the tie comprising:
   an elongate shaft including a penetrating segment, an impact segment, and a mesial segment therebetween;
   a generally conical pointed tip at an end of the penetrating segment for penetrating the insulating layer and positioning within the first structural layer while the first structural layer is in an unhardened state, the pointed tip being generally conical with a cut-out therein to form at least one rotatable cutting edge in the generally conical pointed tip, wherein the cut-out is a single cut-out and extends over about 40° to about 90° of a circumference of the generally conical pointed tip;
   wherein the penetrating segment includes a recessed portion recessed into the shaft for anchoring the penetrating segment within the first structural layer once the first structural layer has hardened; and
   a plurality of discontinuous helical ribs extending laterally outward from the mesial segment of the shaft, the penetrating segment being devoid of any helical ribs, wherein the discontinuous helical ribs extend laterally from the shaft no more than about 20% of a thickness of the shaft;
   wherein the plurality of discontinuous helical ribs include a first section of ribs and a second section of ribs, the first section of ribs being on one face of the shaft, and the second section of ribs being on an opposite face of the shaft, so as to be centered 180° from the first section of ribs, wherein the first section of ribs is aligned with a first set of flats recessed into the shaft both distal and proximal to the first section of ribs, and wherein the second section of ribs is aligned with a second set of flats recessed into the shaft both distal and proximal to the second section of ribs.

14. A tie as in claim 13, wherein the entirety of the tie is injection molded from a single, integral piece of molded material.

15. A tie as in claim 13, wherein the discontinuous helical ribs extend laterally from the shaft no more than about 10% of the thickness of the shaft.

16. A tie as in claim 13, further comprising an enlarged non-circular driving head at an end of the impact segment which driving head can be received within a corresponding socket of a driving tool to drive the tie through the insulating layer and into the first structural layer.

17. A method for manufacturing an insulating composite wall structure including first and second structural layers and an insulating layer disposed between the first and second structural layers in a desired configuration, the method comprising:
   providing a tie comprising:
      an elongate shaft including a penetrating segment, an impact segment, and a mesial segment therebetween;

a generally conical pointed tip at an end of the penetrating segment for penetrating the insulating layer, the generally conical pointed tip including a single cut-out therein to form a rotatable cutting edge in the generally conical pointed tip, wherein the single cut-out in the conical pointed tip comprises a single notch extending from a distal tip towards a base of the generally conical pointed tip, wherein the single notch comprises a generally planar triangular shaped floor extending from an apex at a longitudinal axis of the shaft to the base of the generally conical pointed tip, the generally planar triangular shaped floor being vertical when the longitudinal axis of the shaft is horizontal; and a plurality of helical ribs extending laterally outward from the mesial segment of the shaft, wherein the helical ribs extend laterally from the shaft no more than about 20% of a thickness of the shaft, so that the ribs do not substantially interfere with axially pushing the mesial segment into the insulating layer without rotating the tie during axial advancement, such that the tie may be axially pushed into the insulating layer and first structural layer, or screwed into the insulating layer and first structural layer, as selected by a user;

forming the first structural layer from a hardenable high strength structural material;

positioning an insulating layer comprising a material having a higher thermal resistance than the first structural layer against a surface of the first structural layer while the first structural layer is in a substantially unhardened state;

a performer of the method considering whether to (i) axially push the tie through an exposed surface of the insulating layer, or (ii) to screw the tie through the exposed surface of the insulating layer, the user making a decision to install the tie according to either (i) or (ii);

axially pushing the ties through an exposed surface of the insulating layer according to (i) or screwing the tie through an exposed surface of the insulating layer according to (ii), as decided by the user;

wherein the penetrating segment of the tie penetrates the insulating layer and is positioned so as to be embedded within the first structural layer, such that the mesial segment is disposed substantially within the insulating layer, and such that a substantial portion of the impact segment extends from the exposed surface of the insulating layer;

forming the second structural layer from a hardenable high strength structural material on the exposed surface of the insulating layer such that the substantial portion of the impact segment extending from the insulating layer is embedded within the second structural layer; and allowing the first and second structural layers to become substantially hardened, thereby forming the insulating composite wall structure in which the first structural layer, the second structural layer, and the insulating layer are secured together by the one or more ties.

18. A method as in claim 17, wherein the method for manufacturing an insulating composite wall structure comprises a tilt-up method.

19. An insulating composite wall structure comprising:
a first structural layer comprising a hardened high strength structural material;
a second structural layer comprising a hardened high strength structural material;
an insulating layer comprising a material having a higher thermal resistance than the first and second structural layers disposed between the first and second structural layers, the structural layers being secured together by one or more ties as recited in claim 1.

20. A tie for use in making an insulating composite wall structure including first and second structural layers comprising hardenable material and an insulating layer having a high thermal resistance disposed between the first and second structural layers, the tie comprising:
an elongate shaft including a penetrating segment, an impact segment, and a mesial segment therebetween;
a generally conical pointed tip at an end of the penetrating segment for penetrating the insulating layer and positioning within the first structural layer while the first structural layer is in an unhardened state, the pointed tip being generally conical with a cut-out therein to form at least one rotatable cutting edge in the generally conical pointed tip;
wherein the penetrating segment includes a recessed portion recessed into the shaft for anchoring the penetrating segment within the first structural layer once the first structural layer has hardened; and
a plurality of discontinuous helical ribs extending laterally outward from the mesial segment of the shaft, the penetrating segment being devoid of any helical ribs, wherein the discontinuous helical ribs extend laterally from the shaft no more than about 20% of a thickness of the shaft;
wherein the plurality of discontinuous helical ribs include a first section of ribs and a second section of ribs, the first section of ribs being on one face of the shaft, and the second section of ribs being on an opposite face of the shaft, so as to be centered 180° from the first section of ribs, wherein the first section of ribs is aligned with a first set of flats recessed into the shaft both distal and proximal to the first section of ribs, and wherein the second section of ribs is aligned with a second set of flats recessed into the shaft both distal and proximal to the second section of ribs;
wherein discontinuities between aligned ribs of the first section of ribs and the second section of ribs are misaligned relative to both the first and second sets of flats that are recessed into the shaft both distal and proximal to the first and second sections of ribs.

21. An insulating composite wall structure comprising:
a first structural layer comprising a hardened high strength structural material;
a second structural layer comprising a hardened high strength structural material;
an insulating layer comprising a material having a higher thermal resistance than the first and second structural layers disposed between the first and second structural layers, the structural layers being secured together by one or more ties as recited in claim 13.

22. A method for manufacturing an insulating composite wall structure including first and second structural layers and an insulating layer disposed between the first and second structural layers in a desired configuration, the method comprising:
providing a tie comprising:
an elongate shaft including a penetrating segment, an impact segment, and a mesial segment therebetween;
a generally conical pointed tip at an end of the penetrating segment for penetrating the insulating layer and positioning within the first structural layer while the first structural layer is in an unhardened state, the pointed tip being generally conical with a cut-out therein to form at least one rotatable cutting edge in the generally conical pointed tip;

wherein the penetrating segment includes a recessed portion recessed into the shaft for anchoring the penetrating segment within the first structural layer once the first structural layer has hardened; and a plurality of discontinuous helical ribs extending laterally outward from the mesial segment of the shaft, the penetrating segment being devoid of any helical ribs, wherein the discontinuous helical ribs extend laterally from the shaft no more than about 20% of a thickness of the shaft so that the ribs do not substantially interfere with axially pushing the mesial segment into the insulating layer without rotating the tie during advancement, such that the tie may be axially pushed into the insulating layer and first structural layer, or screwed into the insulating layer and first structural layer, as selected by a user;

wherein the plurality of discontinuous helical ribs include a first section of ribs and a second section of ribs, the first section of ribs being on one face of the shaft, and the second section of ribs being on an opposite face of the shaft, so as to be centered 180° from the first section of ribs, wherein the first section of ribs is aligned with a first set of flats recessed into the shaft both distal and proximal to the first section of ribs, and wherein the second section of ribs is aligned with a second set of flats recessed into the shaft both distal and proximal to the second section of ribs;

wherein discontinuities between aligned ribs of the first section of ribs and the second section of ribs are misaligned relative to both the first and second sets of flats that are recessed into the shaft both distal and proximal to the first and second sections of ribs;

forming the first structural layer from a hardenable high strength structural material;

positioning an insulating layer comprising a material having a higher thermal resistance than the first structural layer against a surface of the first structural layer while the first structural layer is in a substantially unhardened state;

a performer of the method considering whether to (i) axially push the tie through an exposed surface of the insulating layer, or (ii) to screw the tie through the exposed surface of the insulating layer, the user making a decision to install the tie according to either (i) or (ii);

axially pushing the ties through an exposed surface of the insulating layer according to (i) or screwing the tie through an exposed surface of the insulating layer according to (ii), as decided by the user;

wherein the penetrating segment of the tie penetrates the insulating layer and is positioned so as to be embedded within the first structural layer, such that the mesial segment is disposed substantially within the insulating layer, and such that a substantial portion of the impact segment extends from the exposed surface of the insulating layer;

forming the second structural layer from a hardenable high strength structural material on the exposed surface of the insulating layer such that the substantial portion of the impact segment extending from the insulating layer is embedded within the second structural layer; and allowing the first and second structural layers to become substantially hardened, thereby forming the insulating composite wall structure in which the first structural layer, the second structural layer, and the insulating layer are secured together by the one or more ties.

\* \* \* \* \*